United States Patent
Kim et al.

(10) Patent No.: US 10,905,953 B2
(45) Date of Patent: Feb. 2, 2021

(54) METHOD OF CONTROLLING INFORMATION PROCESSING DEVICE, INFORMATION PROCESSING DEVICE AND NON-TRANSITORY COMPUTER-READABLE RECORDING MEDIUM STORING PROGRAM FOR INFORMATION PROCESSING

(71) Applicant: LINE Corporation, Tokyo (JP)

(72) Inventors: Yongdae Kim, Tokyo (JP); Makoto Numata, Tokyo (JP)

(73) Assignee: LINE Corporation, Tokyo (JP)

( * ) Notice: Subject to any disclaimer, the term of this patent is extended or adjusted under 35 U.S.C. 154(b) by 0 days.

(21) Appl. No.: 16/235,090

(22) Filed: Dec. 28, 2018

(65) Prior Publication Data

US 2019/0184283 A1  Jun. 20, 2019

Related U.S. Application Data

(63) Continuation of application No. PCT/JP2017/007793, filed on Feb. 28, 2017.

(30) Foreign Application Priority Data

Jun. 28, 2016  (JP) .................................. 2016-127506

(51) Int. Cl.
 *A63F 13/33*  (2014.01)
 *A63F 13/352*  (2014.01)
 (Continued)

(52) U.S. Cl.
 CPC ............ *A63F 13/352* (2014.09); *A63F 13/35* (2014.09); *A63F 13/69* (2014.09); *A63F 13/79* (2014.09);
 (Continued)

(58) Field of Classification Search
 CPC .... A63F 13/10; A63F 13/12; A63F 13/30–33; A63F 13/332; A63F 13/335;
 (Continued)

(56) References Cited

U.S. PATENT DOCUMENTS

2014/0278873 A1   9/2014  Shimizu et al.
2017/0006322 A1*  1/2017  Dury .................... H04N 21/254

FOREIGN PATENT DOCUMENTS

| JP | 2001-230868 A | 8/2001 |
| JP | 2012-118919 A | 6/2012 |
| JP | 2014-174912 A | 9/2014 |

OTHER PUBLICATIONS

International Search Report dated May 23, 2017 for corresponding International Application No. PCT/JP2017/007793.
(Continued)

*Primary Examiner* — Omkar A Deodhar
(74) *Attorney, Agent, or Firm* — Harness, Dickey & Pierce, P.L.C.

(57) ABSTRACT

A method of controlling an information processing device related to a content platform including transmitting content information relating to content to a user's terminal device, receiving action information relating to actions transmitted from one or more other users' terminal devices with respect to a content situation of the content from a distribution information processing device related to a distribution platform that is configured to distribute the content situation that progresses on the user's terminal device to the one or more other users' terminal devices, and associating benefit information relating to the content with the user in a case where the action satisfies conditions on the basis of the action information may be provided. Also provided is a device and a non-transitory computer-readable recording medium storing a program for performing the method.

14 Claims, 13 Drawing Sheets

(51) Int. Cl.
    *A63F 13/86*     (2014.01)
    *A63F 13/69*     (2014.01)
    *A63F 13/35*     (2014.01)
    *G06Q 50/10*     (2012.01)
    *A63F 13/79*     (2014.01)
    *A63F 13/795*     (2014.01)
    *A63F 13/792*     (2014.01)

(52) U.S. Cl.
    CPC .......... *A63F 13/792* (2014.09); *A63F 13/795* (2014.09); *A63F 13/86* (2014.09); *G06Q 50/10* (2013.01); *A63F 2300/577* (2013.01)

(58) Field of Classification Search
    CPC ........ A63F 13/34; A63F 13/35; A63F 13/352; A63F 13/58; A63F 13/69; A63F 13/79; A63F 13/86; A63F 13/87
    See application file for complete search history.

(56) References Cited

OTHER PUBLICATIONS

"Twitch", [online], accessed Jun. 20, 2016, the Internet <URL: https://www.twitch.tv/>.

\* cited by examiner

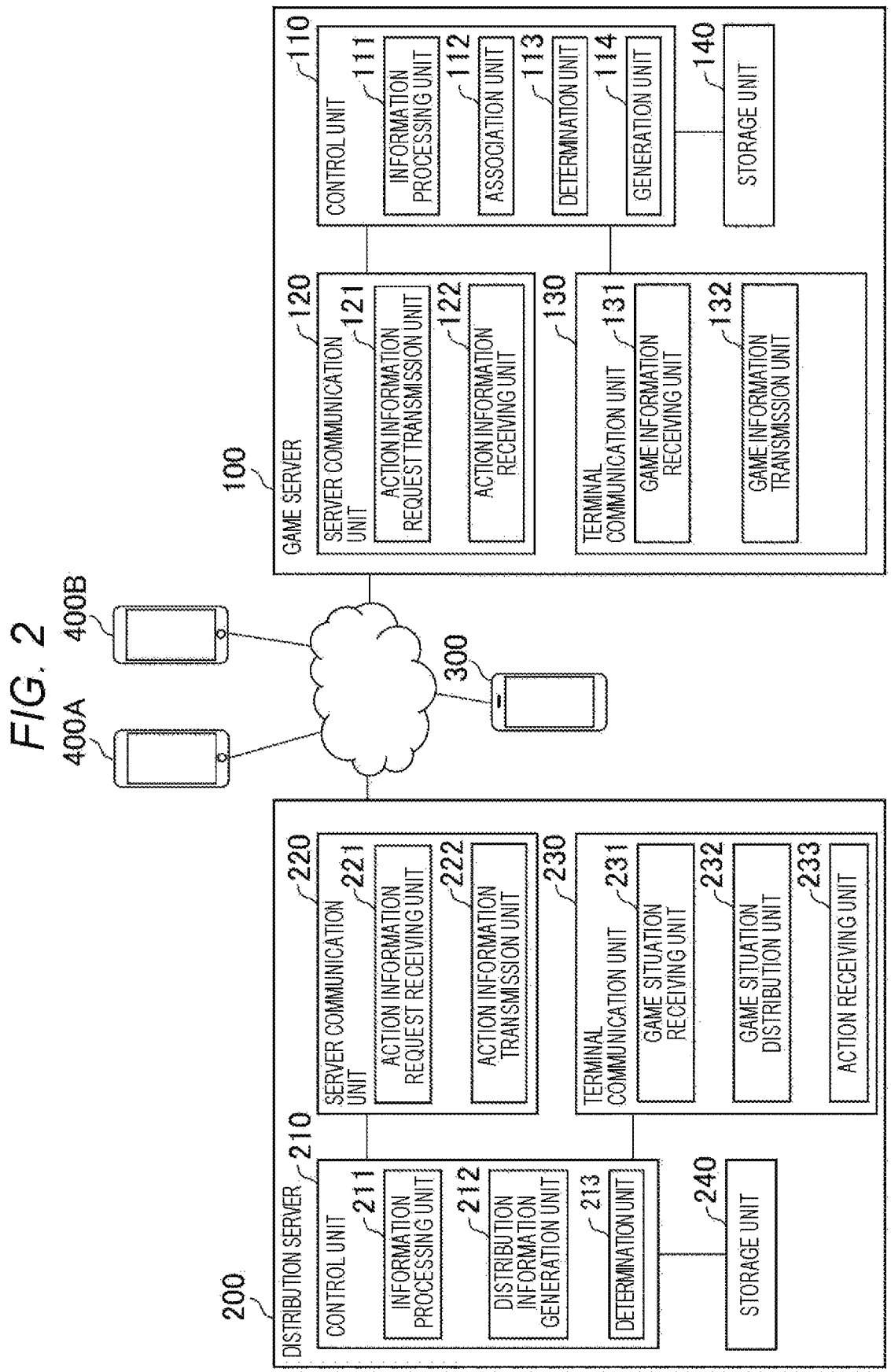

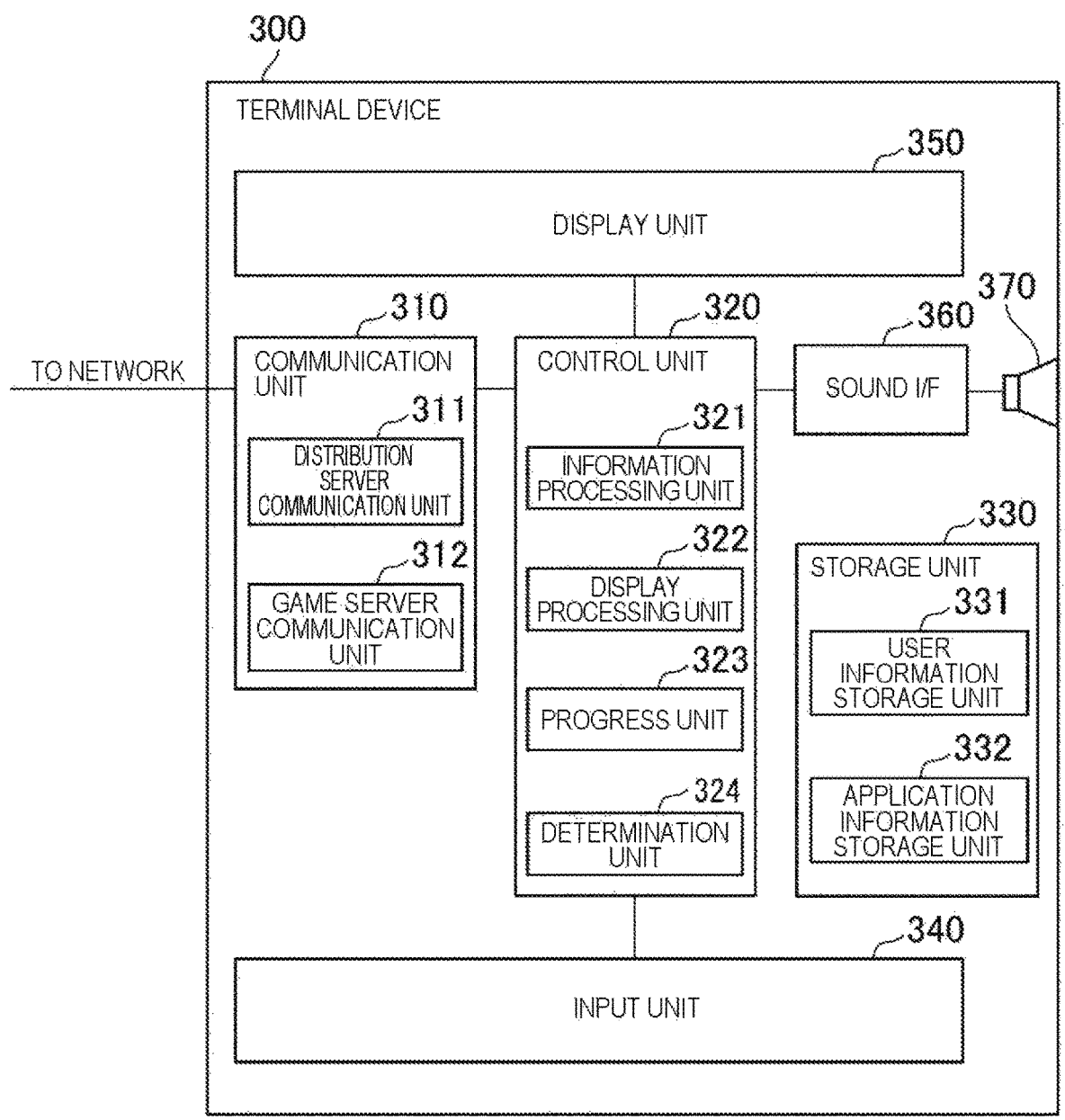

FIG. 5

TBL10

| GAME USER ID | DISTRIBUTION USER ID | BENEFIT INFORMATION |
|---|---|---|
| id_a1**1 | id_901 | item_01<br>item_04 |
| id_b33*5 | id_rt1 | item_01<br>item_12<br>item_20 |
| ⋮ | ⋮ | ⋮ |

FIG. 6

TBL20

| No. | CONDITIONS | BENEFIT |
|---|---|---|
| 1 | THE NUMBER OF SPECTATORS DURING DISTRIBUTION REACHES 100 | GRANT COIN TO DISTRIBUTOR |
| 2 | THE NUMBER OF COMMENTS DURING DISTRIBUTION REACHES 1,000 | GRANT BONUS ITEM TO DISTRIBUTOR |
| 3 | THE NUMBER OF REGISTERED FAVORITES DURING DISTRIBUTION REACHES 10 | INCREASE DISTRIBUTOR'S POWER |
| 4 | THE TOTAL NUMBER OF SPECTATORS AFTER START OF DISTRIBUTION REACHES 10,000 | GRANT RECOVERY ITEM TO DISTRIBUTOR |
| ... | ... | ... |

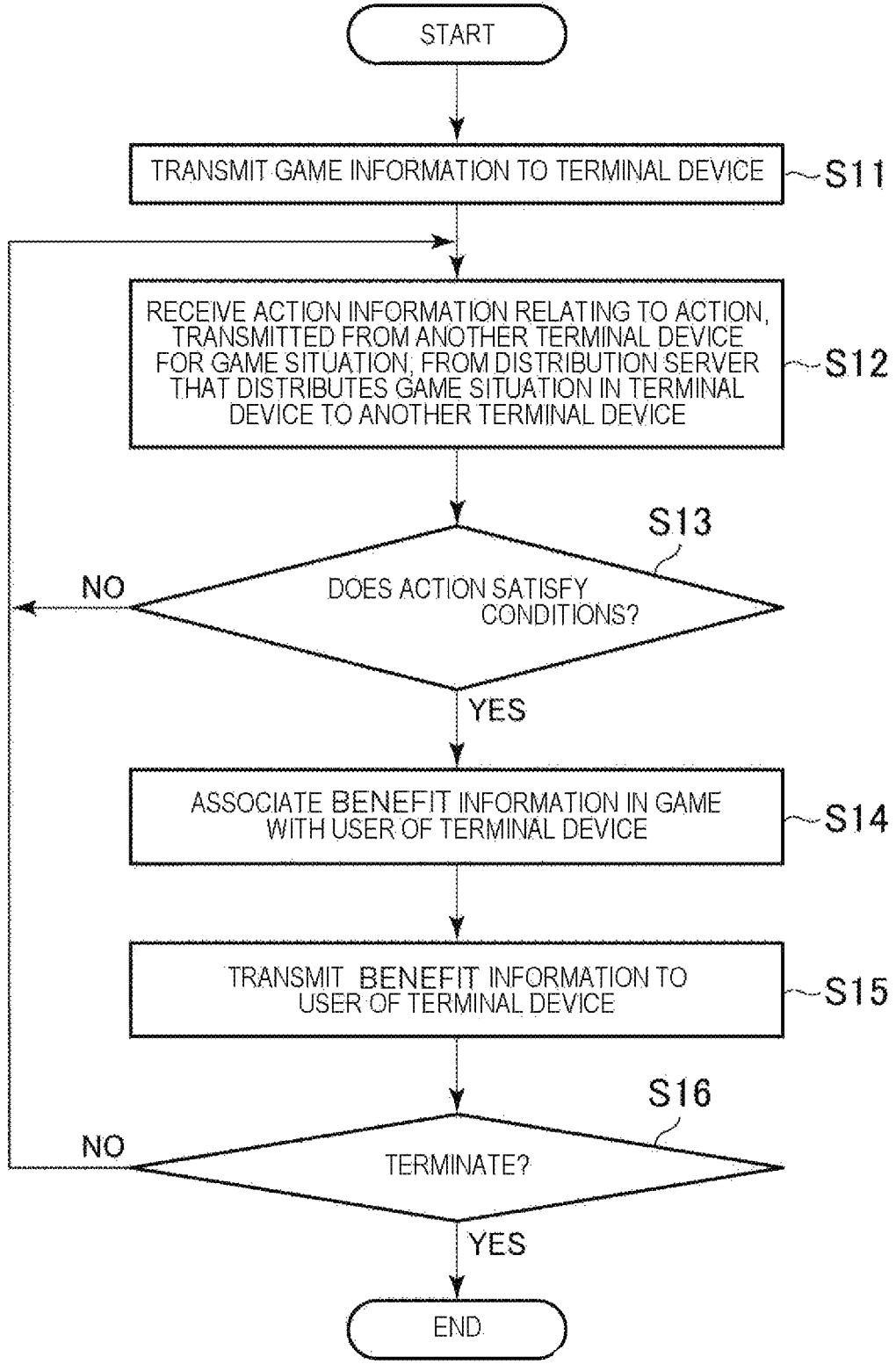

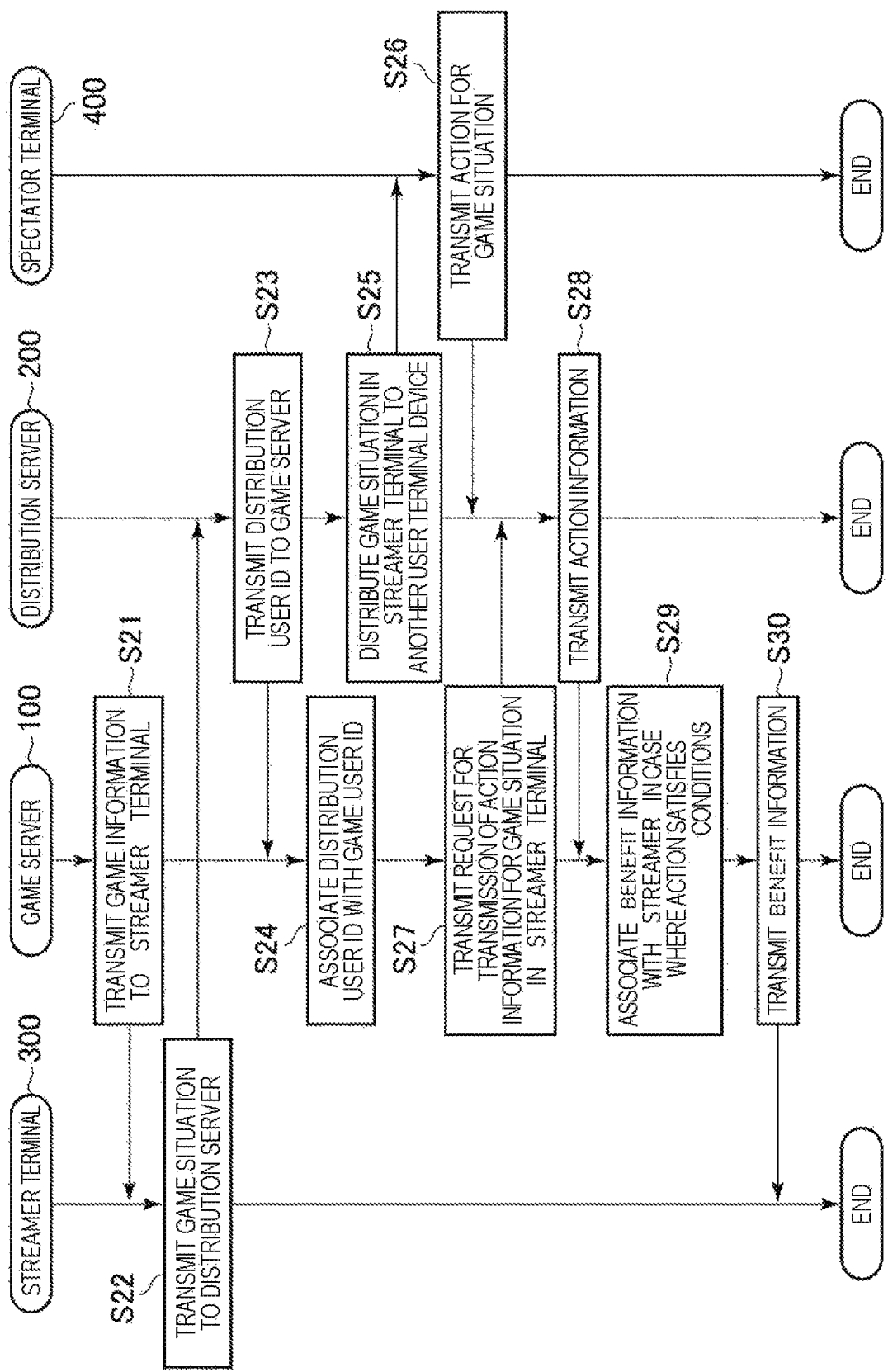

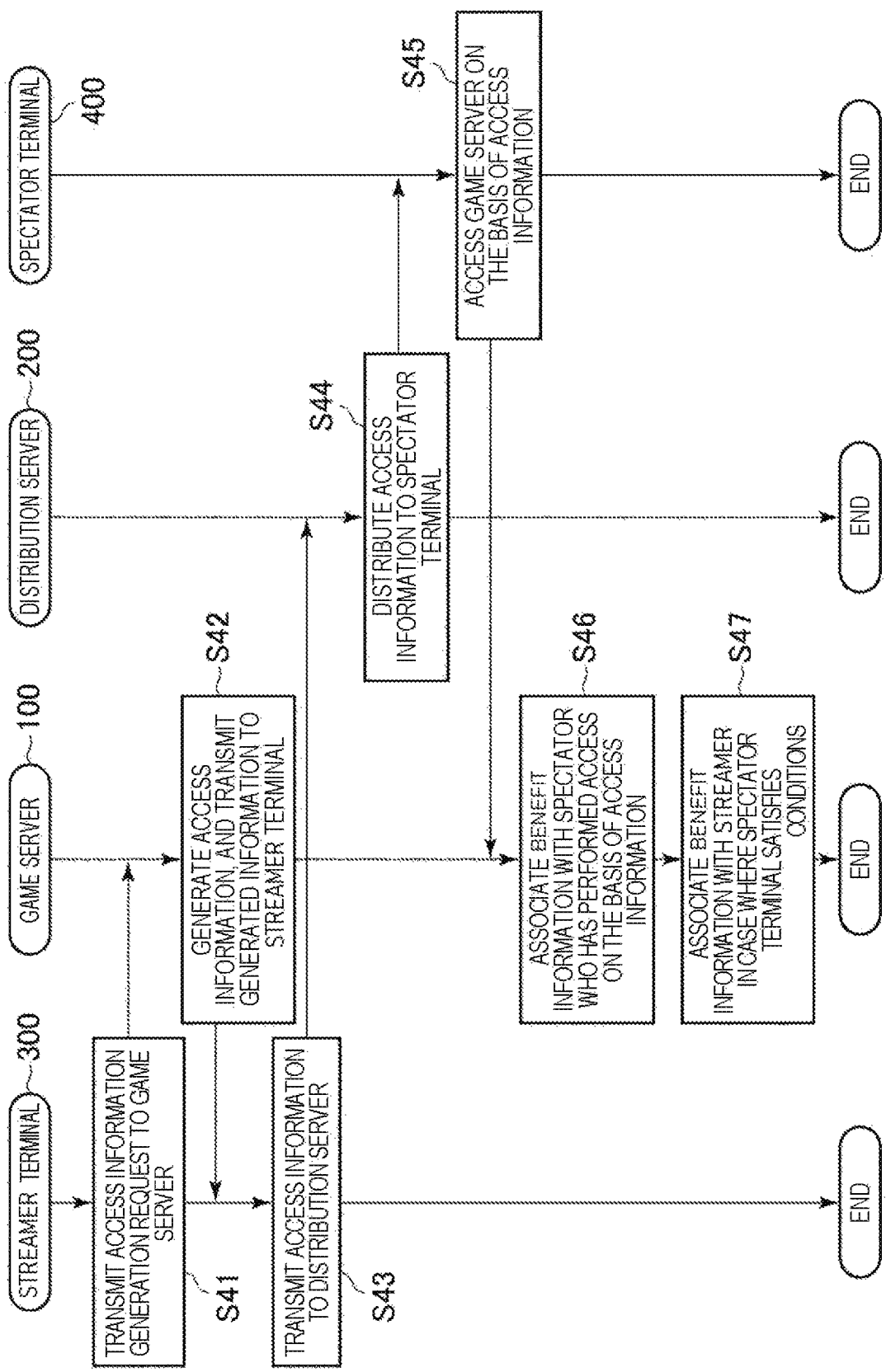

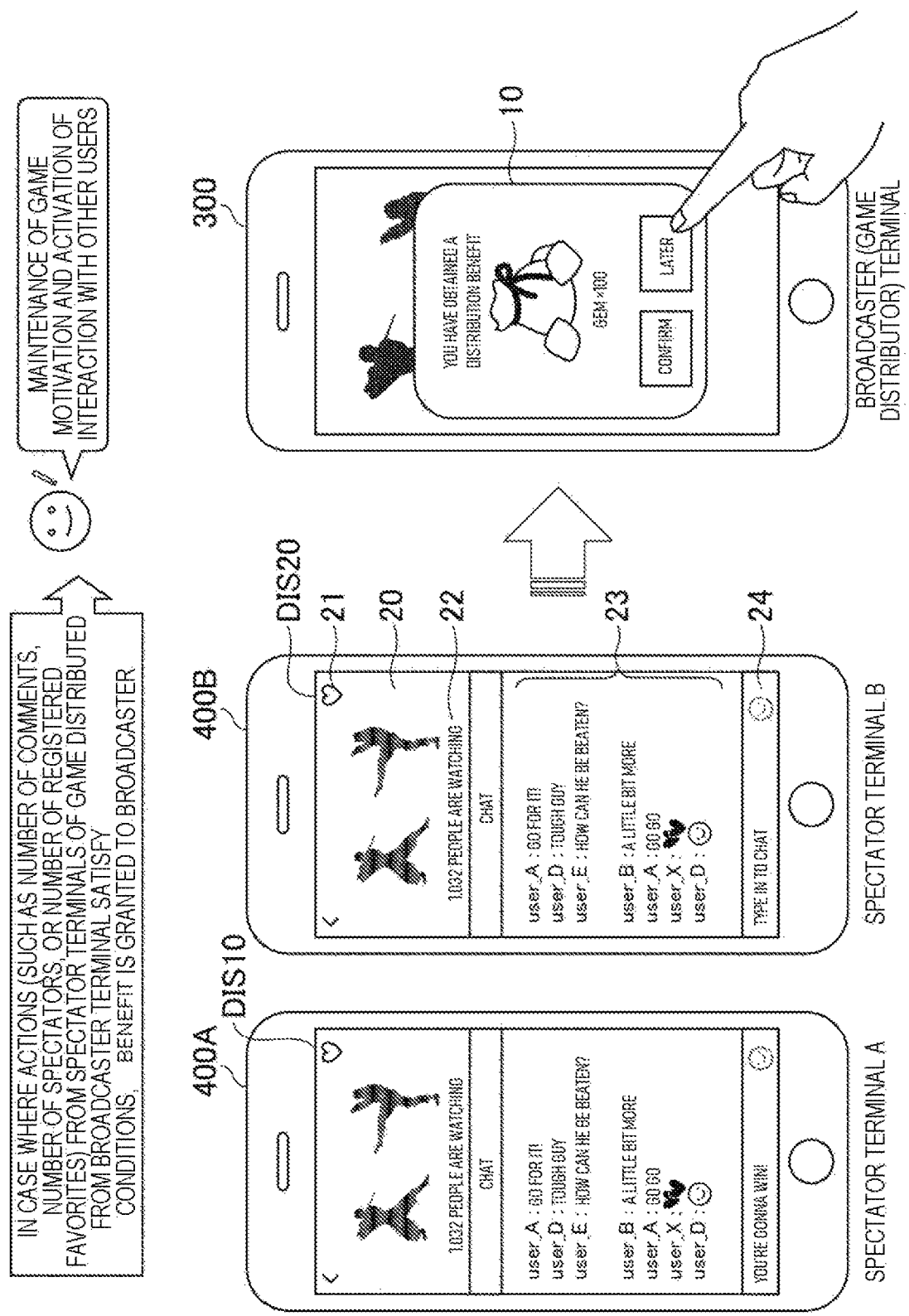

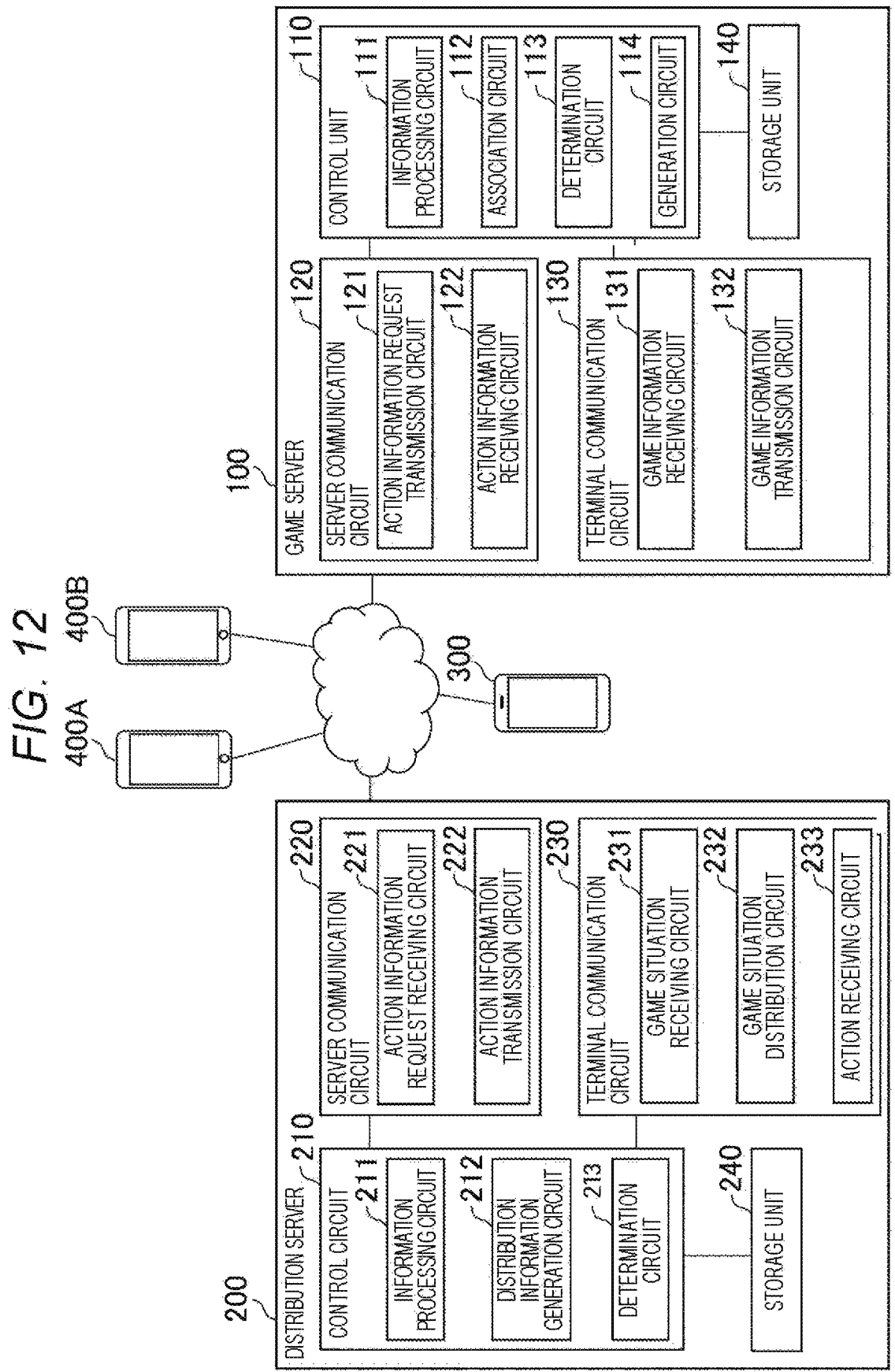

METHOD OF CONTROLLING INFORMATION PROCESSING DEVICE, INFORMATION PROCESSING DEVICE AND NON-TRANSITORY COMPUTER-READABLE RECORDING MEDIUM STORING PROGRAM FOR INFORMATION PROCESSING

CROSS-REFERENCE TO RELATED APPLICATIONS

This U.S. non-provisional application is a continuation application of, and claims the benefit of priority under 35 U.S.C. § 365(c) from, International Application PCT/JP2017/007793 filed on Feb. 28, 2017, and designated the U.S., which is based upon and claims the benefit of priority of Japanese Patent Application No. 2016-127506, filed on Jun. 28, 2016, the entire contents each of which are incorporated herein by reference.

BACKGROUND

Technical Field

The present disclosure relates to methods of controlling an information processing device, information processing devices, and/or non-transitory computer-readable recording media storing a program for information processing, and particularly relates to methods of controlling an information processing device, information processing devices, and/or non-transitory computer-readable recording media storing a program for information processing that are related to a service system in which a distribution platform and a content platform are linked with each other.

Description of the Related Art

In recent years, live distribution services for distributing a game executed in a user's terminal device to other users' terminal devices in real time have become widespread.

For example, a user (streamer) can distribute a game that he or she executes (live-broadcasts) through a distribution platform to other users (spectators). In addition, a spectator can perform some kind of action depending on a distribution platform while spectating the live broadcast of a game performed by a streamer. In such distribution platform, a spectator can chat with other spectators, or register a certain streamer as a favorite, and thus search for the streamer easily from among a large number of streamers. In addition, the number of spectators who spectate the live broadcast of a game is displayed on the spectating screen of a spectator terminal, and serves as the degree of interest in a game.

In the distribution of game live broadcast (content) as described above, a streamer's motivation is dependent on spectators' actions such as the number of spectators, the number of registered favorites, or the number of comments in a chat. For example, in a case where there are a large number of spectators, a motivation to live-broadcast a game is enhanced, and the spectators become further engrossed in the distribution of the game or live broadcast. However, even in a case where there are many actions from spectators, the actions are not reflected through advantageous effects in the game, and a motivation for a streamer to repeatedly execute the game is not provided. Further, a streamer has no means of exchanging his or her game live broadcast with a spectator, and only one-way exchange means from the spectator to the streamer has been present. In addition, even in a case where a spectator spectates the live broadcast of a game and performs some kind of action, such an action is not fed back to the spectator as a reward or an effect, and the spectator's desire to continue to spectate the streamer's live broadcast of the game is reduced.

The present disclosure was conceived in view of the above problem, and provides methods of controlling an information processing device, information processing devices, and/or non-transitory computer-readable recording media storing a program for information processing that are related to a service system in which a distribution platform and a content platform are linked with each other, and which is capable of maintaining a user's motivation to generate and distribute content by granting the user a benefit in content (such as, for example, game progress) which is generated by a user (streamer) in accordance with actions of other users (spectators).

SUMMARY

According to an example embodiments of the present inventive concepts, a method of controlling an information processing device related to a content platform includes transmitting content information relating to content to a user's terminal device, receiving action information relating to actions transmitted from one or more other users' terminal devices with respect to a content situation of the content from a distribution information processing device related to a distribution platform that is configured to distribute the content situation that progresses on the user's terminal device to the one or more other users' terminal devices, and associating first benefit information relating to the content with the user in a case where the action satisfies conditions on the basis of the action information.

In some example embodiments, the method may further include transmitting the benefit information associated in the associating to the user's terminal device In some example embodiments, the method may further include receiving the user's identification information in the distribution platform from the distribution information processing device, associating the user's identification information in the distribution platform with the user's identification information in the content platform, and transmitting a request for transmission of action information for a content situation in the user's terminal device to the distribution information processing device on the basis of the user's identification information in the To the content with another user's terminal device having accessed the content platform in accordance with access information distributed from the user's terminal device through the distribution information processing device.

In some example embodiments, the method may further include associating third benefit information relating to the content with the user in a case where another user's terminal device having accessed the content platform satisfies the conditions.

In some example embodiments, the transmitting a request for transmission of action information and the receiving action information relating to actions may be performed through an application program interface (API).

In some example embodiments, the content platform is a game platform, and the content is a game.

According to an example embodiments of the present inventive concepts, an information processing device related to a content platform includes a memory configured to store computer-readable instructions, and one or more processors configured to execute the computer-readable instructions such that the one or more processors are configured to transmit content information relating to content to a user's terminal device, receive action information relating to actions transmitted from one or more other users' terminal devices with respect to a content situation of the content from a distribution information processing device related to a distribution platform that is configured to distribute the content situation that progresses on the user's terminal device to the other users' terminal devices, and associate first benefit information relating to the content with the user in a case where the action satisfies conditions on the basis of the action information.

According to an example embodiments of the present inventive concepts, a non-transitory computer-readable recording medium storing program that, when executed by a processor in an information processing device, causes the information processing device related to a content platform to perform a method for information processing. The method may include transmitting content information relating to content to a user's terminal device, receiving action information relating to actions transmitted from one or more other users' terminal devices with respect to a content situation of the content from a distribution information processing device related to a distribution platform that is configured to distribute the content situation that progresses on the user's terminal device to the other users' terminal devices, and associating first benefit information relating to the content with the user in a case where the action satisfies conditions on the basis of the action information.

According to the present disclosure, it is possible to provide a method of controlling distribution platform.

In some example embodiments, the conditions may include information as to whether the total number of actions exceeds a threshold.

In some example embodiments, the method may further include generating access information on access to the content platform, which relates to the one or more other users' terminal devices, in accordance with a generation request transmitted from the user's terminal device, transmitting the access information to the user's terminal device, and associating second benefit information relating an information processing device, an information processing device, and non-transitory computer-readable recording medium storing a program for information processing which are related to a service system in which a distribution platform and a content platform are linked with each other, and which is capable of maintaining a user's motivation to generate and distribute content by granting the user a benefit in content which is executed by the user (streamer) in accordance with actions from other users (spectators), which leads to high convenience for the user.

BRIEF DESCRIPTION OF THE DRAWINGS

FIG. 2 is a block diagram of a game server and a distribution server according to an example embodiment of the present inventive concepts.

FIG. 3 is a block diagram of a terminal device according to an example embodiment of the present inventive concepts.

FIG. 5 is an example of user information that is stored in a storage unit.

FIG. 6 is an example of desired (or alternatively, predetermined) conditions which are stored in the storage unit.

FIG. 7 is a flow chart of a method of controlling a server according to an example embodiment of the present inventive concepts.

FIG. 8 is a sequence diagram illustrating processes between a user terminal device, a game server, a distribution server and another user terminal device according to an example embodiment of the present inventive concepts.

FIG. 10 is a sequence diagram illustrating processes between the user terminal device, the game server, the distribution server and another user terminal device according to an example embodiment of the present inventive concepts.

FIG. 11 is a schematic diagram summarily illustrating an example embodiment of the present inventive concepts.

FIG. 12 is a block diagram of a game server and a distribution server according to another example embodiment of the present inventive concepts.

DETAILED DESCRIPTION

<Observance of Communication Privacy>

In a case where some example embodiments of the present inventive concepts disclosed in the present disclosure are carried out, it should be noted that the disclosed example embodiments are carried out in the observance of legal matters related to communication privacy.

In the following description and the drawings, content is assumed to be a game, and a game platform and a game server will be described as examples of a content platform and an information processing device, respectively, but the content according to the present inventive concepts is not limited to a game. In addition, a smartphone will be described as an example of a terminal device, but the terminal device according to the present inventive concepts is not limited to a smartphone, and may be a tablet terminal, a household game console, a cellular phone (feature phone), a personal computer, or another electronic device insofar as a game can be executed using a game platform realized by a game server, and a game situation (game moving image) can be transmitted to a distribution platform. In addition, games provided by a game platform may be any of a native game, a web game, and a hybrid game. These games differ in whether the generation of a game screen in a streamer's terminal device (streamer terminal) is performed on the terminal device side or performed on the game server side, but in either case, game screen information (moving image information) displayed on a desired (or alternatively, predetermined) display unit (such as a smartphone screen or an external display) in the terminal device is transmitted to a distribution server (distribution information processing device).

<System Configuration>

Figure 1:
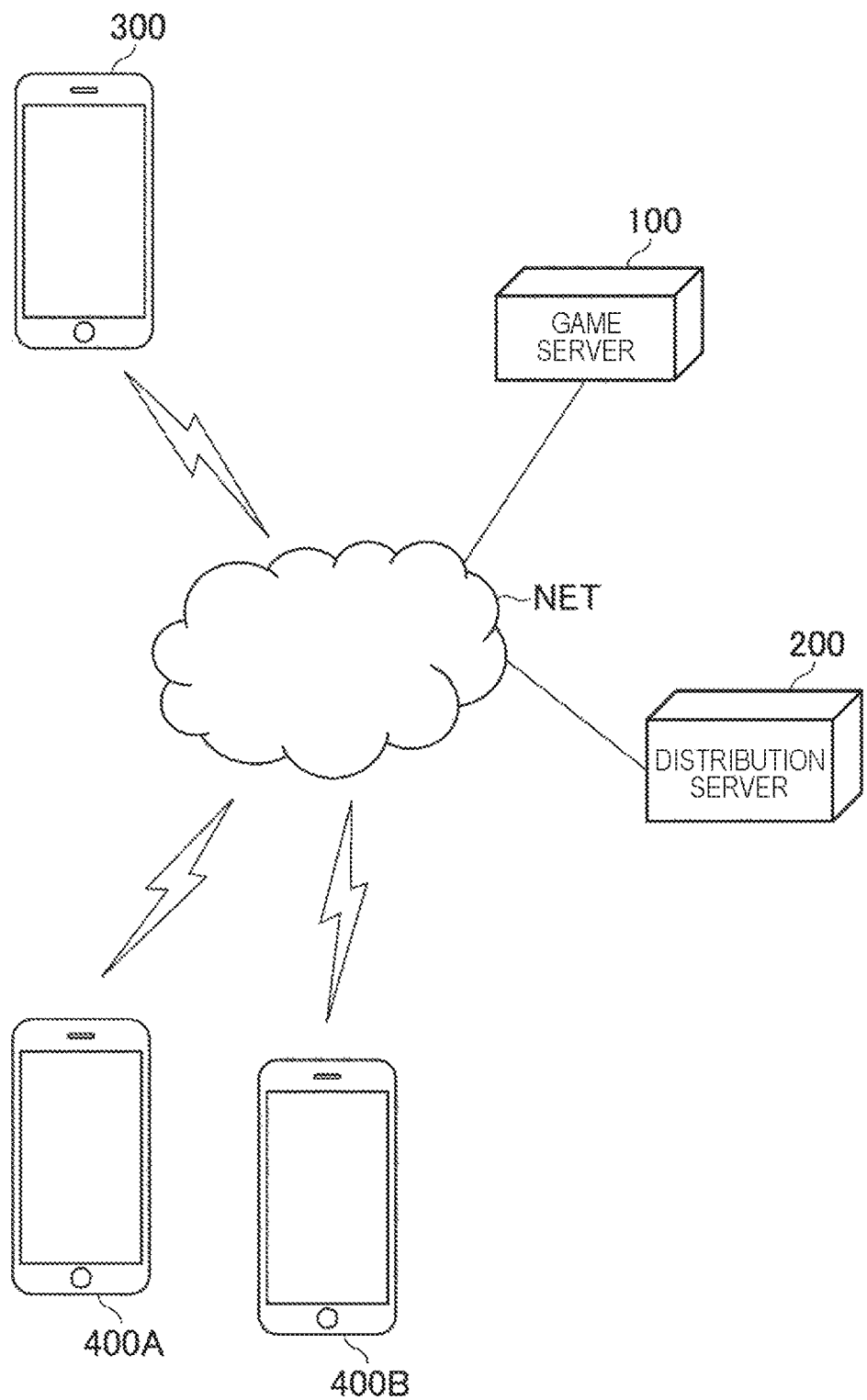
FIG. 1 is a schematic diagram of a service system configuration according to an example embodiment of the present inventive concepts.

Hereinafter, some example embodiments of the present inventive concepts will be described with reference to the accompanying drawings. FIG. 1 is a schematic diagram of a service system configuration according to an example embodiment of the present inventive concepts. As shown in FIG. 1, a service system 500 includes a game server (information processing device) 100, a distribution server (distribution information processing device) 200, a user (streamer) terminal 300, other user (spectator) terminals 400A and 400B, and a network NET. The game server 100 and the distribution server 200 are connected to the terminal devices 300, 400A, and 400B through the network NET. Meanwhile, in FIG. 1, for the purpose of simplifying description, only three terminal devices are shown, but it goes without saying that the number of streamer terminals 300 or spectator terminals 400 may be three or more. Meanwhile, when the spectator terminals 400A and 400B need not be particularly distinguished from each other, they are simply referred to as a spectator terminal 400.

Meanwhile, the network NET may be a wired network or a wireless network partially. For example, the network NET can include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of a public switched telephone network (PSTN), a cellular phone network, integrated service digital networks (ISDNs), wireless LANs, Long Term Evolution (LTE), code division multiple access (CDMA), Bluetooth (registered trademark), satellite communication, or a combination of two or more of these. However, in example embodiments of the present inventive concepts, the network NET is not limited thereto.

The functions of the streamer terminal 300, the spectator terminal 400, the game server 100 and the distribution server 200 in the service system of FIG. 1 will be described simply. First, the streamer terminal 300 communicates with the game server 100 through the network NET, and transmits and receives game information (e.g., a game program, information relating to a competitor, or benefit information to be described later) relating to a game which is desired to execute a game in the streamer terminal 300, a game situation (e.g., a game stage or a match result) of the game which is executed in, for example, the streamer terminal 300. Further, the streamer terminal 300 communicates with the distribution server 200 through the network NET, and transmits game screen information (e.g., moving image information) of a game progressing on the streamer terminal 300 to the distribution server 200. The distribution server 200 generates distribution screen information including the game screen information received from the streamer terminal 300, and transmits the distribution screen information to the spectator terminal 400. Further, the distribution server 200 receives an action performed with respect to the game situation of the streamer terminal 300 in the spectator terminal 400, and updates the distribution screen information on the basis of the action.

The game server 100 receives, for example, a streamer's identification information in a distribution platform, the distribution screen information of the game situation of the streamer terminal 300, or the like from the distribution server 200.

<Summary of the Present Disclosure>

Figure 4B:
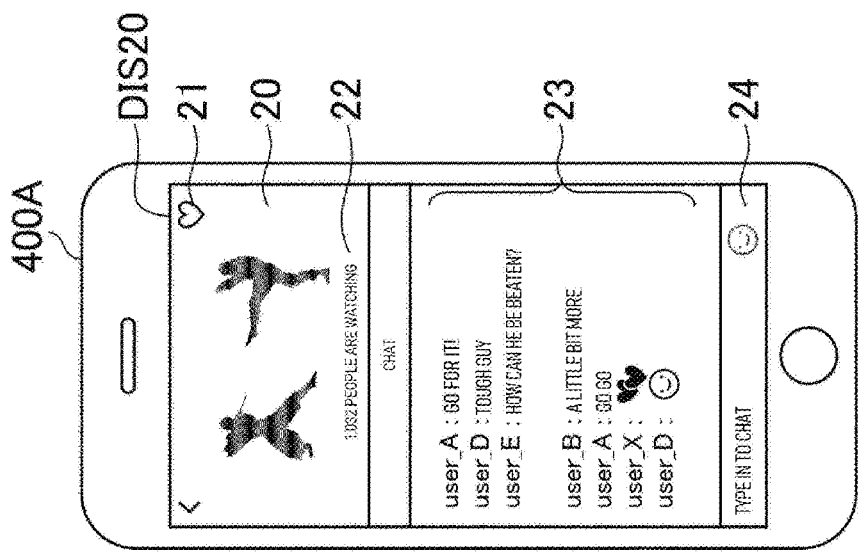
FIG. 4B is an example of a screen of the terminal device of another user (spectator).

Here, an example embodiment of the present inventive concepts will be described with reference to FIG. 11. FIG. 11 is a schematic diagram summarily illustrating an example embodiment of the present inventive concepts. The spectators of the spectator terminals 400A and 400B spectate a game situation in the streamer terminal 300, and the same distribution screens (e.g., DIS20 as shown in FIG. 4B are displayed on the display units of the respective spectator terminals 400, respectively, on the basis of the distribution screen information which is transmitted from the distribution server 200. Because the distribution screens are the same as each other, the distribution screen DIS20 will be described as a representative of the distribution screens. The distribution screen DIS20 of the spectator terminals 400A includes at least a game situation (moving image) 20 happening in the streamer terminal 300, a favorite display icon 21, a number-of-spectators display 22, a list of comments 23, and a comment input box 24.

These elements are updated by the distribution server 200 in accordance with actions (such as start or stop of viewing, transmission of a comment, and registration or deregistration of a favorite) in the spectator terminals 400.

The game server 100 transmits a request to the distribution server 200, and requests the transmission of action information relating to the actions. The game server 100 grants a benefit in a game to a streamer when desired (or alternatively, predetermined) conditions are satisfied by an action included in the action information. The desired (or alternatively, predetermined) conditions may be conditions indicating spectators' degree of interest in the game situation of the streamer terminal 300 (e.g., the number of comments reaching 100 or the number of spectators reaching 1,000). Further, the benefit may be an item capable of being used in a game, an advantageous effect in a game, or the like. Information relating to the granted benefit is transmitted from the game server 100 to the streamer terminal 300, and is provided to a streamer on the display unit of the streamer terminal 300, for example, through a pop-up message 10 as shown in FIG. 11.

In this manner, in an example embodiment of the present inventive concepts, a benefit in a game is granted to a streamer in accordance with an action from a spectator. Therefore, it is possible to enhance a streamer's motivation to distribute a game and a game situation.

<Configuration of Server>

Next, the game server 100 and the distribution server 200 will be described with reference to FIG. 2. The game server 100 and the distribution server 200 are servers related to a game platform and a distribution platform, respectively, and are established by one or a plurality of computers including a control unit (e.g., a processor), a storage unit (e.g., a memory) and the like. That is, the game server 100 and the distribution server 200 may include hardware resources such as a central processing unit (CPU) constituting a control unit, a read only memory (ROM), a random access memory (RAM) or a hard disk drive (HDD) constituting a storage unit, and a communication interface (I/F) constituting a communication unit.

Each functional unit included in the game server 100 or the distribution server 200 described below is realized by software (e.g., a program) which is executed in conjunction with a hardware resource (e.g., the control unit or the storage unit) of the computer described above. In addition, each functional unit may be configured to be dispersed, as desired, without being disposed on a single computer. Meanwhile, the game server 100 and the distribution server 200 may be any information processing device capable of realizing the functions described below.

The game server 100 includes a control unit 110, a server communication unit 120, a terminal communication unit 130 and a storage unit 140. Meanwhile, although the server communication unit 120 and the terminal communication unit 130 are shown separately from each other, so that various types of information or target to be transmitted and received are easier to understand, the communication unit serving as the communication I/F may be the same. That is, the server communication unit 120 and the terminal communication unit 130 also have a function of executing communication (transmission and reception of various types of data) with the streamer terminal 300, the spectator terminal 400 or the distribution server 200 through the network NET in accordance with an instruction from the control unit 110. The communication may be executed in either a wired or wireless manner, and may have any communication protocol used therein insofar as mutual communication can be executed.

The function of each unit will be described simply, and later in greater detail. The server communication unit 120 includes an action information request transmission unit 121 and an action information reception unit 122. The action information request transmission unit 121 transmits a request for transmission of the action information to the distribution server 200. In addition, the action information reception unit 122 receives the action information transmitted from the distribution server 200. The distribution server 200 is related to a distribution platform that distributes a game situation progressing on the streamer terminal 300 to one or more spectator terminals 400. As described above, the action information refers to information relating to an action for a game situation progressing on the streamer terminal 300 that is performed (e.g., displayed) in the spectator terminal 400, and the action includes viewing of a game situation, a comment on the game situation, registration of a streamer as a favorite, or the like. In addition, the action information reception unit 122 receives a streamer's identification information (e.g., an identifier (ID)) in a distribution platform from the distribution server 200. This streamer's identification information in the distribution platform is used when the action information request transmission unit 121 transmits the request for transmission of the action information to the distribution server 200.

The terminal communication unit 130 includes a game information reception unit 131 and a game information transmission unit 132.

The game information reception unit 131 receives game information relating to a game progressing on the streamer terminal 300. The game information which is received by the game information reception unit 131 differs depending on the content of a game, whether the game is a native game or a hybrid game, and the like, but is information relating to the current game stage or a streamer's operation input information detected in the streamer terminal 300. The game information transmission unit 132 transmits game information relating to a game to the streamer terminal 300. The game information that is transmitted by the game information transmission unit 132 includes a game program, benefit information to be described later, and the like. In addition, the game information transmission unit 132 transmits access information to be described later to the streamer terminal 300.

The control unit 110 includes an information processing unit 111, an association unit 112, a determination unit 113 and a generation unit 114. The information processing unit 111 performs a process of advancing a game which is executed in the streamer terminal 300. The determination unit 113 performs various types of determination process, and, for example, determines whether an action from the spectator terminal 400 satisfies desired (or alternatively, predetermined) conditions on the basis of the action information. In a case where the action satisfies the desired (or alternatively, predetermined) conditions, the association unit 112 associates benefit information relating to a game with a streamer. The generation unit 114 generates access information in order for one or more spectator terminals 400 to access a game platform in accordance with a generation request transmitted from the streamer terminal 300.

The storage unit 140 may be realized by various types of recording medium such as an HDD, a solid state drive (SSD), or a flash memory, and has a function of storing various types of program and data which are desired for the game server 100 to operate. The storage unit 140 stores user information of each user who uses a game platform, desired (or alternatively, predetermined) conditions determined by the determination unit 113, and the like. Meanwhile, a correspondence relation between a streamer's identification information in a distribution platform and the streamer's identification information in a game platform, information on benefits granted to the streamer, or the like is stored in the user information. The storage unit 140 may be realized by, for example, a random access memory (RAM), and also includes a memory that functions as a work memory of the control unit 110. The memory stores temporary data or the like. Meanwhile, various types of data stored in the storage unit 140 may be temporarily stored in the memory, and then be stored in the storage unit 140. Meanwhile, the storage unit 140 may be provided outside such as in a database server separate from the game server 100.

Next, the distribution server 200 will be described. The distribution server 200 includes a control unit 210, a server communication unit 220, a terminal communication unit 230 and a storage unit 240. Meanwhile, although the server communication unit 220 and the terminal communication unit 230 are shown separately from each other, so that various types of information or target to be transmitted and received are easier to understand, the server communication unit 220 and the terminal communication unit 230 may be implemented as a single communication interface (I/F). That is, one single communication I/F may be configured to execute communication (transmission and reception of various types of data) with the streamer terminal 300, the spectator terminal 400, and/or the game server 100 through the network NET in accordance with an instruction from the control unit 210. The communication may be executed in either a wired or wireless manner, and may have any communication protocol used therein insofar as mutual communication can be executed.

The server communication unit 220 includes an action information request reception unit 221 and an action information transmission unit 222. The action information request reception unit 221 receives an action information request transmitted from the game server 100. The action information transmission unit 222 transmits the action information to the game server 100. In addition, the terminal communication unit 230 includes a game situation reception unit 231, a game situation distribution unit 232 and an action reception unit 233. The game situation reception unit 231 receives game screen information (moving image information) displayed on the display unit of the streamer terminal 300. Further, the game situation reception unit 231 receives sound information of a game progressing on the streamer terminal 300, a streamer's sound information, or the like. The game situation distribution unit 232 transmits distribution information including a game situation (moving image information or sound information) executed in the streamer terminal 300 to the spectator terminal 400. The action reception unit 233 receives an action of the spectator terminal 400 with respect to the game situation.

The control unit 210 includes an information processing unit 211, a distribution information generation unit 212 and a determination unit 213. The information processing unit 211 performs processing of various types of information, and the determination unit 213 performs various types of determination process. The distribution information generation unit 212 generates distribution information for spectator screen display data that is transmitted (distributed) to the spectator terminal 400 and displayed on the display unit of the spectator terminal 400. That is, a game situation, the number of spectators and the like are included in the distribution information.

The storage unit 240 stores information for a spectator and a streamer who use a distribution platform.

FIG. 2 describes the game server 100 and the distribution server 200 as including various units. It should be noted the various units illustrated in FIG. 2 are functional units, and may be implemented by, for example, a memory and one or more processors that are configured to perform the various functions.

FIG. 12 illustrates another example in which the various functions units of the game server 100 and the distribution server 200 are implemented by respective physical circuits.

<Configuration of Terminal Device>

Next, a terminal device will be described. FIG. 3 is a block diagram of a terminal device (streamer terminal 300 or spectator terminal 400). Meanwhile, both the streamer terminal 300 and the spectator terminal 400 are described as smartphones, but insofar as these terminals can realize functions described below, both may be different from each other. For example, the streamer terminal 300 may be a personal computer and the spectator terminal 400 may be a smartphone. In addition, for the purpose of simplifying description, the description will be given for the streamer terminal 300, but it is noted that the same is true of the spectator terminal 400. Meanwhile, in the terminal devices 300 and 400, each platform program is installed or use registration with each platform is performed so that a distribution platform and a game platform can be used.

The terminal device 300 includes a communication unit 310, a control unit 320, a storage unit 330, an input unit 340, a display unit 350, a sound interface (I/F) 360 and a speaker 370.

The communication unit 310 includes a distribution server communication unit 311 and a game server communication unit 312, and has a function of executing communication with the game server 100 or the distribution server 200 through the network NET. The communication may be executed in either a wired or wireless manner, and may have any communication protocol used therein insofar as mutual communication can be executed.

The control unit 320 is a processor having a function of controlling each unit of the terminal device 300. The control unit 320 includes an information processing unit 321, a display processing unit 322, a progress unit 323, and a determination unit 324. The information processing unit 321 has a function of controlling the transmission of various types of information (such as game information or a game situation in the case of the streamer terminal 300, and an action in the case of the spectator terminal 400) from the communication unit 310 to the game server 100 or the distribution server 200 in accordance with information which is input from the input unit 340. In addition, the information processing unit 321 also has a function of transmitting information received from the game server 100 or the distribution server 200 in the communication unit 310 to the display processing unit 322. The display processing unit 322 has a function of converting display data transmitted from the information processing unit 321 into pixel information, and writing the converted data in the frame buffer of the display unit 350. The progress unit 323 causes a game to progress on the basis of operation input from the input unit 340. The determination unit 324 performs various types of determination process.

The storage unit 330 has a function of storing various types of program or various types of data which are desired for the terminal device 300 to operate. For example, information such as a program for using a distribution platform or a game platform is included in the storage unit 330. Meanwhile, the storage unit 330 may be realized by various types of recording medium such as a HDD, a SSD, or a flash memory.

The display unit 350 is a monitor having a function of displaying an image in accordance with display data written in a frame buffer by the display processing unit 322, and is realized by, for example, a liquid crystal display or an organic electroluminescence display (OELD). The display unit 350 displays a game screen in a case where it is the streamer terminal 300, and displays a spectating screen in a case where it is the spectator terminal 400. In addition, the display unit 350 displays a notification transmitted from the game server 100. Meanwhile, the display unit 350 may be a head mounted display (HDM), or may be realized by a device capable of display image or text information or the like into projection mapping, a hologram, air (or a vacuum), or the like. Further, the display unit 350 may be able to display 3D display data. However, in example embodiments of the present inventive concepts, the display unit 350 is not limited thereto.

The sound I/F 360 is an interface of the speaker 370 or an earphone and a microphone which are not shown. The speaker 370 outputs a sound of a game or a game situation to be distributed. Meanwhile, a streamer can also distribute his (or her) sound, music or the like through a microphone.

The input unit 340 accepts input from a user (streamer or spectator), and transmits information related to the input to the control unit 320. In the terminal device 300, the input unit 340 is realized by a touch panel or the like, detects contact using an indicator tool such as a user's finger or a stylus and the contact position, and transmits coordinates of the contact position to the information processing unit 321. Meanwhile, the input unit 340 may be a keyboard, a game controller or the like without being limited to a touch panel.

FIG. 3 describes the terminal device 300 as including various units. It should be noted the various units illustrated in FIG. 3 are functional units, and may be implemented by, for example, a memory and one or more processors that are configured to perform the various functions.

Figure 13:
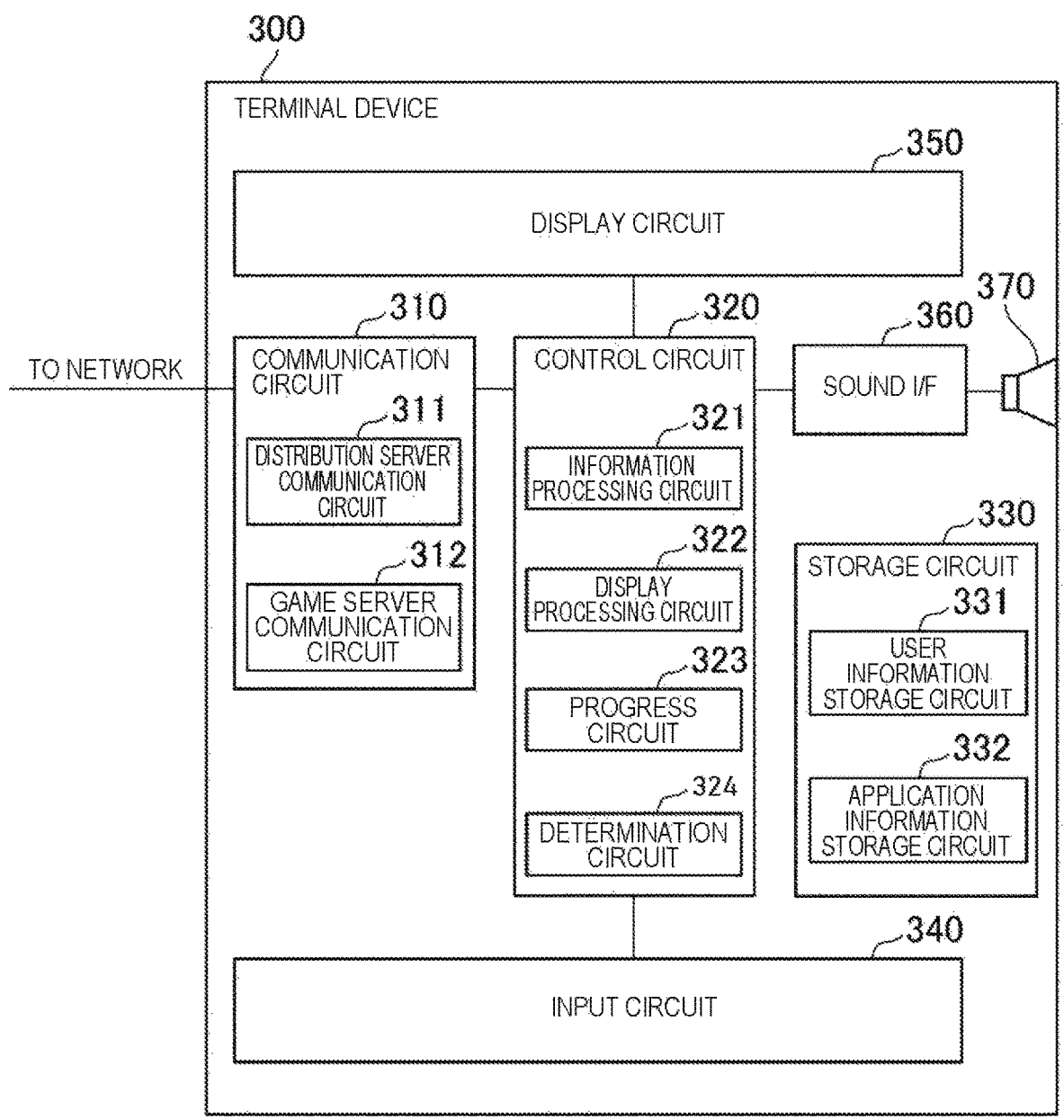
FIG. 13 is a block diagram of a terminal device according to another example embodiment of the present inventive concepts.

FIG. 13 illustrates another example in which the various functions units of the terminal device 300 are implemented by respective physical circuits.

Figure 4A:
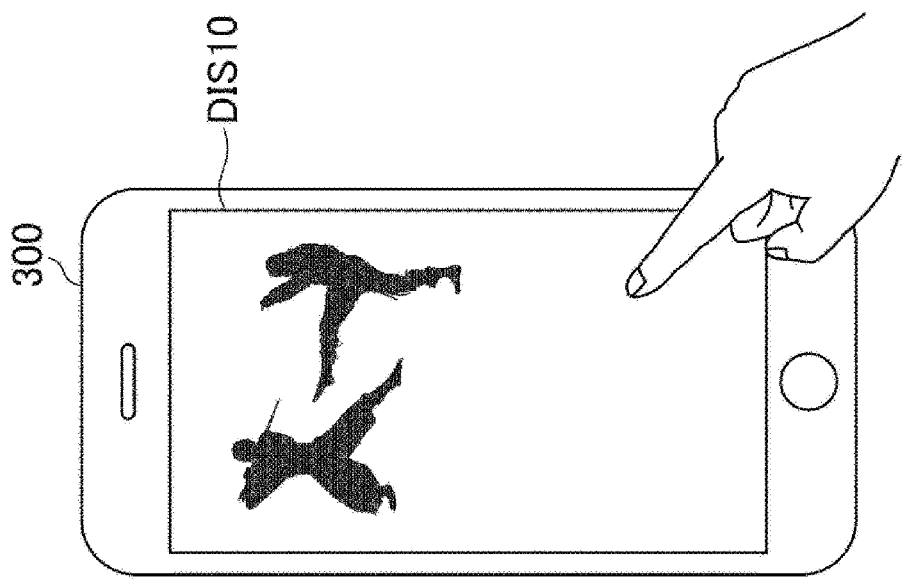
FIG. 4A is an example of a screen of the terminal device of a user (streamer)

Next, display screens of the streamer terminal 300 and the spectator terminal 400 will be described with reference to FIGS. 4A and 4B. FIG. 4A is a game screen example of the streamer terminal 300, and FIG. 4B is a spectating screen example of the spectator terminal 400. As shown in FIG. 4A, a game is executed in the streamer terminal 300, and a game screen DIS10 is displayed on its display unit. Meanwhile, the game screen DIS10 is not a still image, but a moving image, and information relating to a moving image of the game screen DIS10 displayed on the display unit 350 is transmitted from the distribution server communication unit 311 of the streamer terminal 300 to the distribution server 200. As shown in FIG. 4B, a spectating screen DIS20 is displayed on a display unit 450 of the spectator terminal 400. The spectating screen DIS20 includes a game live broadcast moving image 20, a favorite display icon 21, a number-ofspectators display 22, a list of comments 23 and a comment input box 24. The game live broadcast moving image 20 is to display a game screen DIS20 of the streamer terminal 300 based on the display data transmitted from the distribution server 200.

Information obtained by associating a user in a distribution platform with a user who uses a game platform is stored in the storage unit 140 of the game server 100 in order to associate benefit information to be described later with a streamer. FIG. 5 is an example of a user information table TBL10 that is stored in the storage unit 140. As shown in the drawing, a correspondence relation between identification information (game user ID) in a game platform and identification information (distribution user ID) in a distribution platform is stored in the user information table TBL10. In addition, an item or the like in a game granted to a user may also be stored as the benefit information. The identification information in a distribution platform may be transmitted from the distribution server 200 to the game server 100, for example, in a case where the determination unit 213 of the distribution server 200 has determined the game to be a game of a game platform of the game server 100.

FIG. 6 is a table TBL20 indicating the association of desired (or alternatively, predetermined) conditions relating to an action with benefit information when the desired (or alternatively, predetermined) conditions are satisfied, and is stored in the storage unit 140 of the game server 100. Meanwhile, the benefit information differs depending on the content of a game, and there is no limitation thereto. The determination unit 113 of the game server 100 refers to the table TBL20, and determines whether a spectator's action satisfies desired (or alternatively, predetermined) conditions. The desired (or alternatively, predetermined) conditions may indicate whether a streamer's game situation is interesting, for example, the number of spectators reaching 100 after the start of distribution or the number of comments exceeding 1,000.

Meanwhile, in order to determine whether a spectator's action satisfies the desired (or alternatively, predetermined) conditions, the game server 100 needs information about the number of spectators, the number of registered favorites, a comment or the like of a game situation that is distributed from the streamer terminal 300 through the distribution server 200. Therefore, the action information request transmission unit 121 of the game server 100 transmits an action information request for requesting the transmission of the spectating screen information shown in FIG. 4B to the distribution server 200. In this case, in order to receive action information for a game situation distributed by a streamer having, for example, a game user ID of "id_a1**1" on the basis of the association between the pieces of identification information shown in FIG. 5, the action information request transmission unit 121 requests spectating screen information of a streamer having a distribution user ID of "id_901" from the distribution server 200.

Meanwhile, the transmission of the action information request and the reception of the action information are performed using an application program interface (API). The spectating screen information that is provided by the distribution server 200 is released to the outside using the API included in a program for realizing each functional unit of the distribution server 200, and thus the spectating screen information can be accessed through the API. The game server 100 can designate a distribution user ID of a user who requests the transmission of the spectating screen information through the API and a point (such as a game moving image or a comment) in the spectating screen information at which transmission is requested, and transmit the result to the distribution server 200. In addition, the spectating screen information that is transmitted from the distribution server 200 is also transmitted through the API. Because a spectator's action (e.g., favorite registration, a comment, and/or the number of spectators) is included in the spectating screen information, the information processing unit 111 extracts the spectator's action on the basis of the spectating screen information, and a determination performed by the determination unit 113 is performed.

In this manner, according to an example embodiment of the present inventive concepts, because spectating screen information that is acquired using an API and released by a distribution platform is used in the acquisition of a spectator's action information, the action information can be easily acquired without applying a load to the distribution server 200.

A method of controlling the game server 100 according to the example embodiment of the present inventive concepts described above will be described with reference to FIG. 7. FIG. 7 is a flow chart of the above-described control method.

First, the game information transmission unit 132 transmits the game information (game program) to the terminal device (streamer terminal) 300 (step S11). The game information reception unit 131 receives action information, relating to an action transmitted from the spectator terminal 400 with respect to a game situation, from the distribution server 200 that distributes a game situation in the streamer terminal 300 to another terminal device (spectator terminal) 400 (step S12). Meanwhile, before this, the action information request transmission unit 121 designates a streamer's distribution user ID, and requests the transmission of the action information (e.g., transmission of the spectating screen information). The determination unit 113 determines whether the action satisfies desired (or alternatively, predetermined) conditions on the basis of the action information (step S13). In a case where it is determined by the determination unit 113 that the desired (or alternatively, predetermined) conditions are satisfied, the association unit 112 associates benefit information in a game with a streamer (step S14). The associated information is stored in the storage unit 140. The associated benefit information is transmitted to the streamer terminal 300 thereafter (step S15). This benefit information may include display information for causing the display unit 350 of the streamer terminal 300 to display information relating to a benefit, sound information for causing the speaker 370 of the streamer terminal 300 to output a sound, or the like. Thereafter, in a case where an instruction for ending a game is transmitted from the streamer terminal 300 (YES in step S16), the game is ended. Meanwhile, a determination performed by the determination unit 113 may be performed whenever the action information is received, and an instruction for transmission of the spectating screen information may be written at a desired (or alternatively, predetermined) interval (for example, every five minutes) in an API that is transmitted from the action information request transmission unit 121.

Here, an exchange between the game server 100, the distribution server 200, the streamer terminal (user terminal device) 300, and the spectator terminal (another user terminal device) 400 described above will be described with reference to a sequence diagram. FIG. 8 is a sequence diagram illustrating an example embodiment of the present inventive concepts. First, the game information is transmitted from the game server 100 to the streamer terminal 300 (step S21). In the streamer terminal 300, a game is executed, and a game situation is transmitted to the distribution server 200 (step S22). Thereafter, a distribution user ID in a distribution platform is transmitted from the distribution server 200 to the game server 100 (step S23). In the game server 100, a distribution user ID and a game user ID are associated with each other (step S24). The distribution server 200 distributes a game situation in the streamer terminal 300 to the spectator terminal 400 (step S25). The spectator terminal 400 transmits an action for the game situation to the distribution server 200 (step S26). The game server 100 transmits a request for transmission of action information for a game situation in the streamer terminal to the distribution server 200 (step S27). The distribution server 200 transmits the action information in accordance with the request (step S28). The game server 100 determines whether the action satisfies desired (or alternatively, predetermined) conditions, and associates benefit information in a game with a streamer in a case where the desired (or alternatively, predetermined) conditions are satisfied (step S29). Thereafter, the benefit information is transmitted from the game server 100 to the streamer terminal 300 (step S30). In addition, a distribution user ID and a game user ID may be associated with each other in advance.

As described above, according to some example embodiments of the present inventive concepts, a benefit in a game is granted to a streamer in accordance with the action of a spectator who spectates the game situation of the streamer. Therefore, it is possible to enhance the streamer's motivation to continue to distribute a game situation, and to provide the streamer with a motivation to repeatedly execute a game. In addition, because a benefit is granted in accordance with a comment from a spectator, the streamer is motivated to pursue game play methods which are highly amusing and fascinating the spectator, and thus can improve the capability of a game.

In the above, an aspect in which benefit information in a game is granted to a streamer has been described. Hereinafter, an aspect in which benefit information is granted to a spectator will be described. According to an example embodiment of the present inventive concepts, a streamer who grants a benefit in accordance with a spectator's action can provide a spectator with benefit information as a reward. The benefit information can be obtained by accessing a game platform using access information in order for a spectator to access a game platform, and the access information is distributed from a streamer terminal through a distribution platform to a spectator terminal.

Figure 9A:
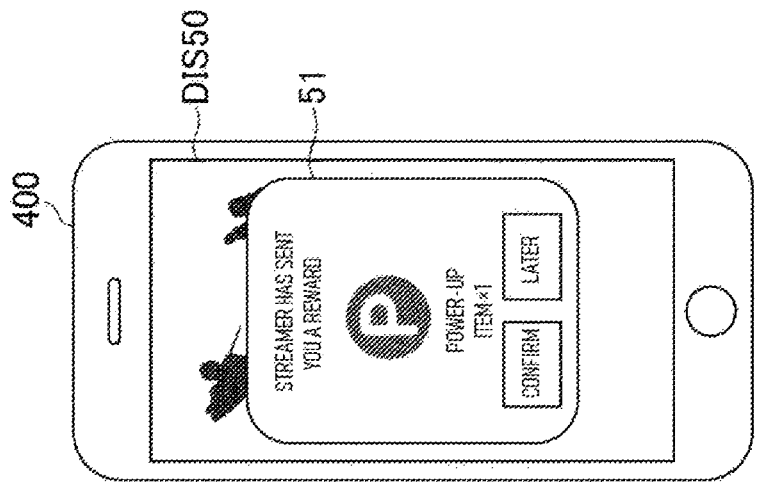
FIG. 9A is an example of a screen of the terminal device of a user (streamer)
Figure 9B:
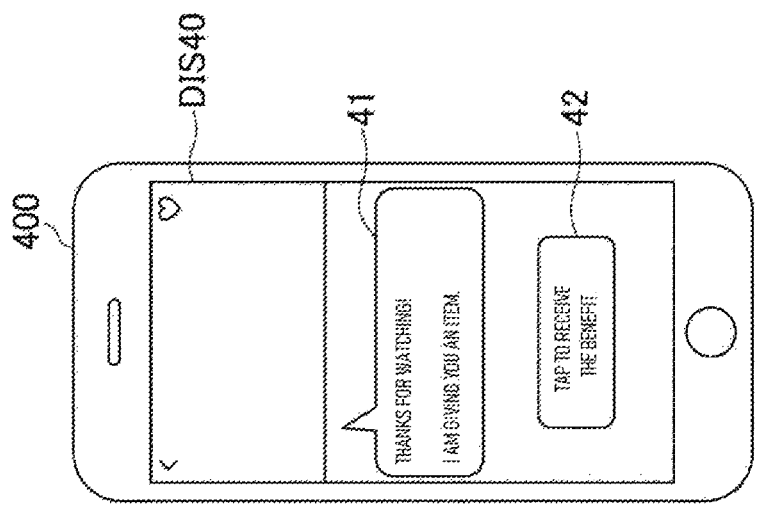
FIGS. 9B and 9C are examples of screens of the terminal device of another user (spectator).

FIGS. 9A and 9B are schematic diagrams illustrating some aspects in which benefit information in a game is granted to a spectator.

The display processing unit 322 in the streamer terminal 300 causes the display unit 350 to display a management screen for generating the access information on the basis of a user's input operation using the input unit 340. FIG. 9A is an example of an access information generation and management screen DIS30. As shown in the drawing, the access information generation and management screen DIS30 includes a game title designation box 31, an accepting user designation box 32, a reward item selection button 33, an item grant total number designation box 34 and a creation and determination button 35. A streamer designates the title of a game that he or she distributes, an item granted to a spectator as a reward, the effect of a game, or the like on this management screen, and thus can transmit a request for generating the access information to the game server 100. Here, as an accepting user, all the spectators may be targeted, and a user who has input a comment among spectators, a user who has registered a streamer as a favorite, a user whose spectating cumulative time is a desired (or alternatively, predetermined) time or longer, or the like may be able to be designated. In addition, although not shown in the management screen DIS30, a message from a streamer may be able to be input.

The information processing unit 321 of the streamer terminal 300 transmits the access information generation request to the game server 100 on the basis of a streamer's input operation of the management screen DIS30. The generation unit 114 of the game server 100 generates access information on the basis of the access information generation request, and transmits the generated information to the streamer terminal 300. Here, the access information includes a link (e.g., a uniform resource locator (URL)) for accessing a game platform. The generated access information is transmitted from the game server 100 to the streamer terminal 300.

Figure 9C:
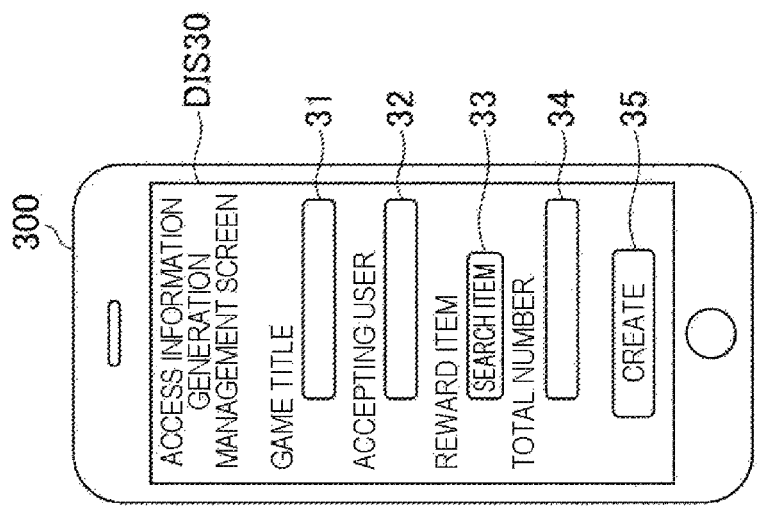

The streamer terminal 300 transmits the access information or a message from a streamer to a spectator to the distribution server 200. The distribution information generation unit 212 of the distribution server 200 generates spectating screen information on the basis of the received access information or the like, and transmits the generated information to the spectator terminal 400. Here, FIG. 9B is a spectating screen example of the spectator terminal 400 that has received the access information. As shown in the drawing, a message 41 from a streamer, a button 42 on which a link destination for accessing a game platform is set, and the like are displayed on a spectating screen DIS40. In a case where the button 42 is selected by a spectator, the spectator terminal 400 accesses a game platform, and benefit information is associated with a spectator of the spectator terminal 400 in the game server 100 and is stored in a storage unit. Here, FIG. 9C is an example of a display screen DIS50 when the spectator terminal 400 that is granted a benefit executes the same game as that of a streamer. As shown in the drawing, when the spectator terminal 400 executes a game, a message 51 indicating information for a reward from a streamer may be displayed.

In this manner, according to an example embodiment of the present inventive concepts, it is possible to make an interaction between a streamer and a spectator of granting a reward from a streamer to a spectator. Because a spectator can grant a benefit to a streamer by taking an action on a game distributed by the streamer, and can obtain a benefit from the streamer in accordance therewith, it is possible to cause the spectator to continue to spectate the streamer's game situation, and to provide a motivation to perform an action.

Meanwhile, a user who does not use a game platform among spectators is also considered to be present. In this case, the determination unit 113 of the game server 100 may determines whether a user who has accessed a game platform through the access information is registered with the game platform, and transmit display information for displaying a message, generated by the generation unit 114, which prompts the user to perform use registration with the game platform in a case where the user is not registered. Thereby, it is possible to increase the number of users who use a game platform.

Meanwhile, in a case where the number of accesses to a game platform through the access information exceeds a desired (or alternatively, predetermined) number, a benefit may be further granted to a streamer who has granted a reward. Thereby, it is possible to prompt a streamer to grant a reward to a spectator, and to further activate an interaction between the streamer and the spectator.

An exchange between the game server 100, the distribution server 200, the streamer terminal 300 and the spectator terminal 400 according to the above-described example embodiment will be described with reference to a sequence diagram. FIG. 10 is a sequence diagram illustrating an example embodiment of the present inventive concepts. First, the access information generation request is transmitted from the streamer terminal 300 to the game server 100 (step S41). Meanwhile, the streamer terminal 300 is granted a benefit on the basis of actions of one or more spectator terminals 400. The game server 100 generates access information, and transmits the access information to the streamer terminal 300 (step S42). The streamer terminal 300 transmits the access information to the distribution server 200 (step S43). The distribution server 200 distributes the access information to the spectator terminal 400 (step S44). The spectator terminal 400 accesses the game server 100 (game platform) on the basis of the access information (step S45). The game server 100 associates the benefit information with a spectator who has accessed the game platform on the basis of the access information (step S46). Meanwhile, in a case where the spectator terminal 400 that has accessed the game platform using the access information satisfies desired (or alternatively, predetermined) conditions, the game server 100 may associate the benefit information with a streamer (step S47).

According to an example embodiment of the present disclosure, a benefit in a game is granted to a streamer in accordance with the action of a spectator who spectates the game situation of the streamer. Therefore, it is possible to enhance the streamer's motivation to continue to distribute a game situation, and to provide the streamer with a motivation to repeatedly execute a game. In addition, since a benefit is granted in accordance with a comment from a spectator, the streamer gropes for a game play method for highly amusing and fascinating the spectator, and thus can improve the capability of a game.

Further, according to an example embodiment of the present inventive concepts, display information for causing a display unit to display the benefit information for a benefit granted to a streamer is transmitted to the streamer terminal 300. Therefore, a streamer can recognize that a benefit is granted to himself (or herself), and a motivation to be further engrossed in a game can be given to the streamer.

Further, according to an example embodiment of the present inventive concepts, a streamer's identification information in a distribution platform is transmitted from the distribution server 200, and the game server 100 can request the transmission of a spectator's action information for a game situation that is performed by a streamer from the distribution server 200, using the identification information. Therefore, it is possible to centrally manage a streamer's identification information in a distribution platform and a game platform.

In addition, according to an example embodiment of the present inventive concepts, the benefit is granted to a streamer in a case where a spectator's action satisfies desired (or alternatively, predetermined) conditions. The desired (or alternatively, predetermined) conditions are conditions indicating the degree of a spectator's interest in a streamer's game situation, and make it possible to provide a streamer with a motivation to be further engrossed in a game so as to draw a spectator's action.

Further, according to an example embodiment of the present inventive concepts, a reward is granted from a streamer to a spectator. Thereby, it is possible to make an interaction between a streamer and a spectator. In addition, a reward may be able to be granted in a case where a benefit based on a spectator's action is granted by a streamer. Thereby, it is possible to provide the spectator with a motivation to spectate the streamer's game situation. Further, in a case where the spectator's access to a game platform satisfies desired (or alternatively, predetermined) conditions in accordance with the streamer's grant of a reward to the spectator, a benefit in a game may be further granted to the streamer. Thereby, it is possible to further deepen a two-way interaction between a streamer and a spectator.

Further, according to an example embodiment of the present inventive concepts, action information is transmitted and received between the game server 100 and the distribution server 200 through an API. Therefore, there is an advantage of a load not being applied to the distribution server 200.

Some example embodiments according to the present inventive concepts have been described, but it goes without saying that the present inventive concepts are not limited thereto. For example, the desired (or alternatively, predetermined) conditions, the benefit information, and/or the display screen are illustrative, and there is no limitation thereto. In addition, the disclosed embodiments may be realized by a combination thereof.

In addition, an aspect in which a benefit of a game is granted to a streamer in accordance with desired (or alternatively, predetermined) conditions has been described, but an item or the like that brings about a disadvantageous effect in a game may be granted in accordance with desired (or alternatively, predetermined) conditions such as the number of spectators decreasing sharply, or a streamer's grant of a reward to a spectator not being performed.

In addition, in the above, an aspect in which a benefit is granted in accordance with the number of comments of a spectator has been described, but a benefit may be granted in accordance with the content of a comment. For example, a benefit may be granted in a case where there are many favorable comments such as "do your best" and "cheer for you", and a desired (or alternatively, predetermined) item may be granted in accordance with a comment of support in a game such as "you may use OO". This can be realized, for example, by the information processing unit 111 analyzing a comment included in the access information.

Meanwhile, in the above, an aspect in which a game in the streamer terminal 300 is live-distributed will be described, but the present inventive concepts are not limited thereto, and a recorded game situation may be distributed. Thereby, more popular moving images are repeatedly spectated, which increases the possibility of a benefit being granted each time. Therefore, it is possible to provide a motivation for a streamer to repeatedly challenge a game so as to gain game skill or the like for further attracting spectators.

In addition, in a case where a game is a competition game, a case is also considered in which one user performs distribution, and a competition user does not perform distribution. In such a case, a benefit according to a spectator's action is granted to only the one user performing distribution, and the competitor user may experience disadvantage in game balance. Therefore, a notification for prompting a competition user to use a distribution platform may be transmitted from the game server 100.

Further, in the above, an aspect in which the game server 100 makes a determination of whether a spectator's action satisfies desired (or alternatively, predetermined) conditions has been described. However, the above-described determination may be made by the distribution server 200, or may be made by the streamer terminal 300. In a case where the determination is made by the distribution server 200, action information or information indicating that desired (or alternatively, predetermined) conditions are satisfied may be transmitted from the distribution server 200 to the game server 100 only in a case where an action satisfies the desired (or alternatively, predetermined) conditions.

In addition, in the above, an aspect in which the live broadcast of a game is distributed has been described, but content to be distributed is not limited to a game, and the present inventive concepts can be applied to a service system in which a desired (or alternatively, predetermined) platform and a distribution platform are linked with each other. For example, the content platform may be a platform that provides virtual reality (VR). In this case, for example, it is considered that a VR platform provides a service such as the generation of VR from an image, a photograph or the like created by a streamer, or the distribution of a streamer's avatar action (such as situation of life) in VR to a spectator terminal. The benefit may be currency on VR or an item. In addition, the content may be a sound, text data or the like.

Further, in the above, a system in which the game server 100 and the distribution server 200 are separated from each other (a game platform and a distribution platform are realized in separate services) has been described, but the present inventive concepts can also be applied to a service system in which a game and moving image distribution are provided as a single service.

In addition, the terminal device is not limited to a smartphone. The terminal device may be any information processing terminal capable of realizing the functions described in the above embodiment, and may be, for example, a laptop computer, a smartphone, a tablet terminal, a cellular phone, a wearable terminal (including a spectacle type, a contact type, a watch type or the like), or a desktop personal computer (PC).

Each functional unit of the game server 100 may be realized by a logic circuit (hardware) or a dedicated circuit formed in an integrated circuit (integrated circuit (IC) chip, large scale integration (LSI)) or the like, and may be realized by software using a central processing unit (CPU). In addition, each functional unit may be realized by one or a plurality of integrated circuits, and functions of a plurality of functional units may be realized by one integrated circuit. The LSI may be referred to as a VLSI, a super-LSI, an ultra-LSI or the like, in some cases, depending on a difference in the degree of integration.

In a case where each functional unit of the game server 100 is realized by software, the game server 100 includes a CPU that executes a command of a program that is software for realizing each function, a read only memory (ROM) or a storage device (called a "recording medium") having the above program and various types of data recorded thereon so as to be readable by a computer (or CPU), a random access memory (RAM) that develops the above program, and the like. A computer (or CPU) reads and executes the above program from the above recording medium, and implements example embodiments of the present inventive concepts. An example of the recording medium capable of being used includes a "non-transitory tangible medium" such as, for example, a tape, a disk, a card, a semiconductor memory, or a programmable logic circuit. In addition, the program may be supplied to the above computer through any transmission medium (such as a communication network or a broadcast wave) which makes it possible to transmit the program. The present inventive concepts may also be realized in a form of a carrier wave-buried data signal in which the program is embodied by electronic transmission.

Specifically, the program stored in a non-transitory computer-readable recording medium according to an example embodiment of the present inventive concepts causes the game server 100 to realize a game information transmission function, an action information reception function, a determination function, an association function, action information request transmission function, a generation function and a storage function. The game information transmission function, the action information reception function, the determination function, the association function, the action information request transmission function, the generation function and the storage function can be realized by the above-described game information transmission unit 132, the action information reception unit 122, the determination unit 113, the association unit 112, the action information request transmission unit 121, the generation unit 114 and the storage unit 140, respectively.

Meanwhile, the above program can be installed, for example, using a script language ActionScript or JavaScript (registered trademark), an object-oriented programming language such as Objective-C or Java (registered trademark), a markup language such as HTML5, and the like.

Although the present disclosure has been described on the basis of some example embodiments and accompanying drawings, it is noted that those skilled in the art can easily perform various modifications or corrections on the basis of the present disclosure. Therefore, it is noted that these modifications or corrections are included in the scope of the present inventive concepts. For example, the functions included in each means and each step, and the like can be rearranged so as not to be logically contradicted with each other, and a plurality of means, steps and the like can be combined into one, or be divided into several parts. In addition, the configurations shown in the above example embodiments may be appropriately combined.

What is claimed is:

1. A server related to a content platform, the server configured to perform:
   transmitting content information relating to content to a user's terminal device;
   receiving action information relating to actions, the action information having been transmitted from one or more other users' terminal devices with respect to a content situation of the content, via a distribution information processing device related to a distribution platform;
   receiving first identification information in the distribution platform from the distribution information processing device, the distribution information processing device configured to distribute the content situation of the content progressing on the user's terminal device to the one or more other users' terminal devices;
   associating first identification information in the distribution platform with second identification information in the content platform, the second identification information in the content platform being different from the first identification information in the distribution platform; and
   associating first benefit information relating to the content with the user in response to the actions satisfying a first condition based on the action information.

2. The server of claim 1, wherein the server is further configured to perform transmitting the first benefit information associated in the associating to the user's terminal device.

3. The server of claim 1, wherein the server is further configured to perform
transmitting a request for transmission of the action information to the distribution information processing device based on first identification information in the distribution platform.

4. The server of claim 1, wherein the first condition includes information as to whether a total number of the actions exceeds a threshold.

5. The server of claim 1, wherein the server is further configured to perform
generating access information on access to the content platform, which relates to the one or more other users' terminal devices, in accordance with a generation request transmitted from the user's terminal device,
transmitting the access information to the user's terminal device, and
associating second benefit information relating to the content with another user's terminal device having accessed the content platform in accordance with the access information distributed from the user's terminal device through the distribution information processing device, the another user's terminal device being among the one or more other user's terminal devices.

6. The server of claim 5, wherein the server is further configured to perform associating third benefit information relating to the content with the user in a case where another user's terminal device having accessed the content platform satisfies a second condition based on the action information.

7. The server of claim 3, wherein the server is configured to perform the transmitting a request for transmission of the action information and the receiving action information relating to actions through an application program interface (API).

8. The server of claim 1, wherein the content platform is a game platform, and the content is a game.

9. An information processing device related to a content platform, comprising:
a memory configured to store computer-readable instructions; and
one or more processors configured to execute the computer-readable instructions such that the one or more processors are configured to,
transmit content information relating to content to a user's terminal device,
receive action information relating to actions, the action information having been transmitted from one or more other users' terminal devices with respect to a content situation of the content, via a distribution information processing device related to a distribution platform,
receive first identification information in the distribution platform from the distribution information processing device, the distribution information processing device configured to distribute the content situation of the content progressing on the user's terminal device to the one or more other users' terminal devices,
associate the first identification information in the distribution platform with second identification information in the content platform, the second identification information in the content platform being different from the first identification information in the distribution platform, and
associate first benefit information relating to the content with the user in response to the actions satisfying a first condition based on the action information.

10. A non-transitory computer-readable recording medium storing program that, when executed by a processor in an information processing device, causes the information processing device related to a content platform to perform a method for information processing, the method comprising:
transmitting content information relating to content to a user's terminal device;
receiving action information relating to actions, the action information having been transmitted from one or more other users' terminal devices with respect to a content situation of the content, via a distribution information processing device related to a distribution platform;
receiving first identification information in the distribution platform from the distribution information processing device, the distribution information processing device configured to distribute the content situation of the content progressing on the user's terminal device to the one or more other users' terminal devices;
associating first identification information in the distribution platform with second identification information in the content platform, the second identification in the content platform being different from the first identification information in the distribution platform; and
associating first benefit information relating to the content with the user in response to the actions satisfying a first condition based on the action information.

11. The server of claim 3, wherein the server is further configured to perform receiving the action information that has been transmitted from the one or more other users' terminal devices to the distribution information processing device from the distribution information processing device in response to a request for transmission of the action information.

12. The information processing device of claim 9, wherein the one or more processors are further configured to,
transmit a request for transmission of the action information to the distribution information processing device based on the first identification information in the distribution platform, and
receive the action information that has been transmitted from the one or more other users' terminal devices to the distribution information processing device from the distribution information processing device in response to the request for transmission of the action information.

13. The non-transitory computer-readable recording medium of claim 10, wherein the method further includes,
transmitting a request for transmission of the action information to the distribution information processing device based on the first identification information in the distribution platform, and
receiving the action information that has been transmitted from the one or more other users' terminal devices to the distribution information processing device from the distribution information processing device in response to the request for transmission of the action information.

14. The server of claim 1, wherein the first identification information is identification information of the user in the distribution platform and the second identification information is identification information of the user in content platform.

* * * * *